Nov. 29, 1938.   S. L. FONTANA   2,138,473
NUT CRACKING MACHINE
Filed Dec. 23, 1935   3 Sheets-Sheet 2

INVENTOR
Sylvester L. Fontana.
By Ralph Kalish
ATTORNEY

Nov. 29, 1938.   S. L. FONTANA   2,138,473
NUT CRACKING MACHINE
Filed Dec. 23, 1935   3 Sheets-Sheet 3

INVENTOR
Sylvester L. Fontana.
By Ralph Rauch
ATTORNEY

Patented Nov. 29, 1938

2,138,473

UNITED STATES PATENT OFFICE 2,138,473

NUT-CRACKING MACHINE

Sylvester L. Fontana, St. Louis, Mo.

Application December 23, 1935, Serial No. 55,802

16 Claims. (Cl. 146—11)

This invention relates to a certain new and useful improvement in nut-cracking machines.

In automatic nut-cracking machines, to which my invention particularly appertains, it is desirable that merely sufficient pressure be applied to the nut to crack the shell thereof, and, inasmuch as the nuts are of varying dimensions, a cracking movement of the anvils towards a nut of a given dimension would be entirely unsuitable for a nut of another dimension, that is to say, the other nut either would not be cracked because of insufficient movement of the anvils, or else would be crushed, rather than only cracked, because of over-sufficient anvil movement.

My present invention has hence for its prime object the provision of a nut-cracking machine having means for setting the anvils on a nut with a uniform pressure and thereafter causing the anvils to move on the nut with a definite and predetermined amplitude of cracking movement, suitably to the characteristics of the kind of nuts being fed to the machine. In such respect, I may briefly now state that I provide a nut-cracking machine in which a linked carrier movable in a linear direction includes cradle means for supporting the nuts to be cracked with their ends laterally presented from the carrier.

A pair of rotary shafts is swingably mounted in lateral adjacency to the carrier for shifting movement towards and away therefrom, and a pair of co-operating anvils is mounted on the shafts for movement in opposed curved or annular paths about and on rotation of the shafts. There may be a plurality or group of anvils mounted on each shaft, and there may be more than one pair of rotary shafts, as will shortly appear. Means are provided for tensionally connecting the shafts for yieldingly shifting the same towards the carrier, and further means are provided for rotating the shafts for moving the anvils in their said paths for yieldingly engaging the same with the opposite ends of a nut on the carrier as the anvils approach endwise opposing relation. By suitably adjusting the tensional means, a uniform pressure will thus be applied by the anvils on the nut to be cracked. Thereafter, on continued rotation of the shafts, the anvils move into opposing relation, and means are provided, to be actuated on such movement of the anvils, for limiting the shiftable movement of the shafts and preventing the displacement of the anvils with respect to the carrier, while the anvils are in such opposing relation, from which it will be seen that, due to the arcuate path of movement of the anvils during such time, the latter move upon the nut with a definite and predetermined amplitude of cracking movement. In such manner, each nut, of whatever varying dimension or size, is treated in the same degree, and thus the machine will furnish a product of uniformly cracked-nuts, the anvils automatically accommodating themselves to the size of the nut prior to the actual cracking operation.

My invention has for another object to generally improve the construction of nut-cracking machines, particularly with respect to the manner in which the speed of production of the machine may be increased by providing more than one set of co-operating anvils in association with the carrier, as, for example, there may be two such groups of opposing anvil-pairs, spaced along the carrier, each crackingly engaging an alternate nut on the carrier, and the whole co-ordinated and synchronized in such manner that the first group of anvils will crack every other one of the nuts as the latter are successively carried therepast, while the following group of anvils will crack the alternate nuts not engaged by the first group. Thus the capacity of the machine may be very high indeed, and, as the several parts move in unison, the rate of production is controlled only by the rate at which the nuts may be fed to the carrier.

And with the above and other objects in view, my invention resides in the novel features of form, construction, arrangement, and combination of parts hereinafter described and pointed out in the claims.

In the accompanying drawings,—

Figure 1:
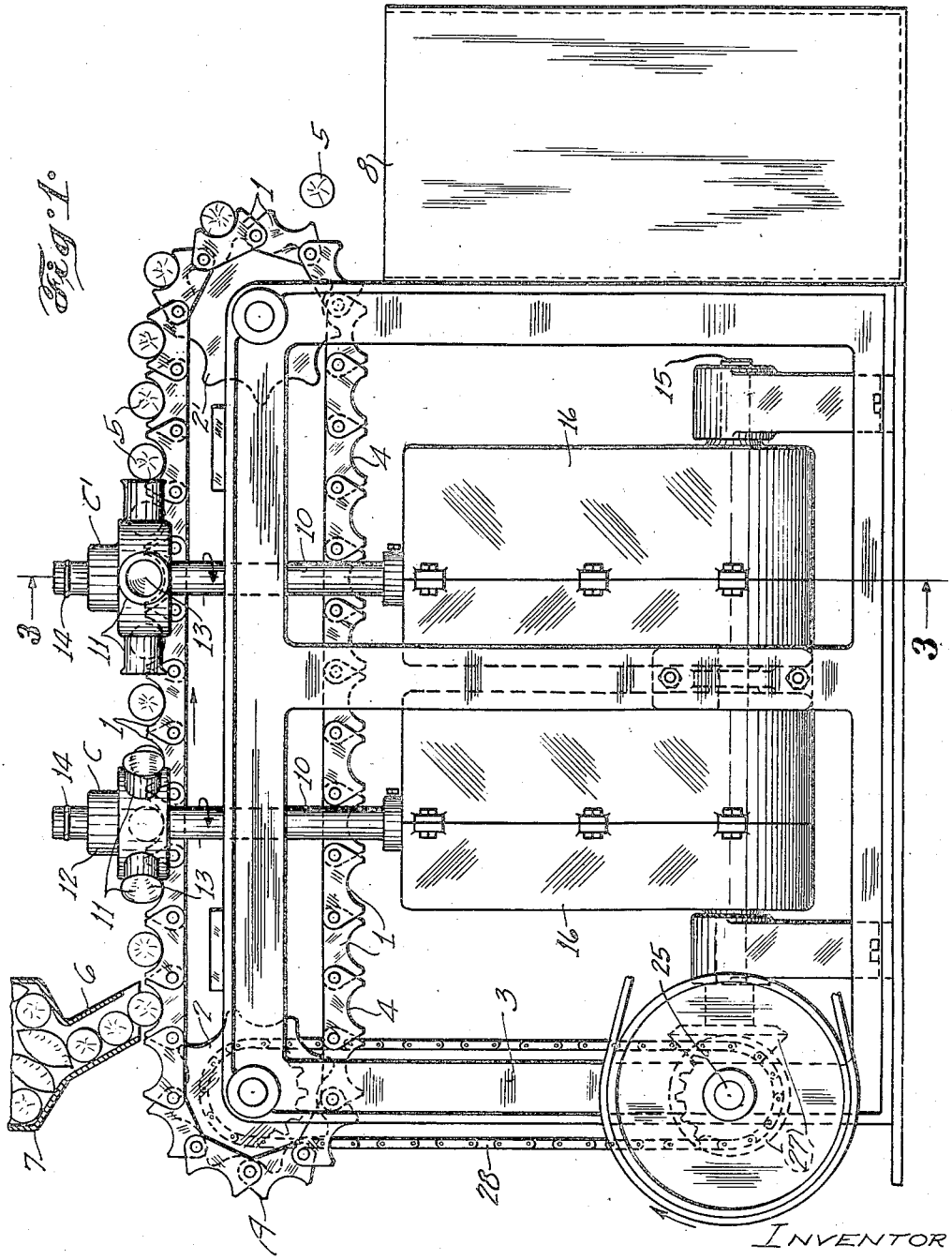
Figure 1 is a side elevational view of a nut-cracking machine embodying my invention.

Referring now more in detail and by reference characters to the drawings, which illustrate a preferred embodiment of my invention, a linked carrier A preferably comprising pin-connected cradle-elements 1, 1, for supporting the nuts to be cracked with their ends laterally presented from the carrier, is mounted for endless passage over suitable sprockets 2, 2', journaled at the opposite ends of the main frame 3 of the machine. The links or cradle-elements 1 are each formed with an outwardly presented concaved or horn-like seat, as at 4, for the deposit transversely thereupon of the particular nuts, as 5, 5, to be cracked, the latter being, in the present instance, fed to the carrier A from a chute 6 communicating with a suitable hopper 7. I might state, however, that the method of feeding the nuts to the carrier may partake of other forms than that shown, and I do not wish to be limited in this respect to the specific construction as set forth. In the present instance, the upper run of the carrier A is disposed in a horizontal linear direction, and the fed nuts 5 rest upon the respective cradle-elements 1 in such manner that, on proper movement of the carrier A, the nuts 5 are successively transported from one end of the machine to the other, during which time, as presently appearing, the nuts are cracked and then finally discharged over the end of the carrier into a suitable receptacle 8, as best seen in Figure 1. I will presently describe how the carrier is operated, inasmuch as the same should preferably move in synchronism or unison with the other several parts of the machine, and as the description proceeds, I will point out in what manner this object is accomplished.

Figure 3:
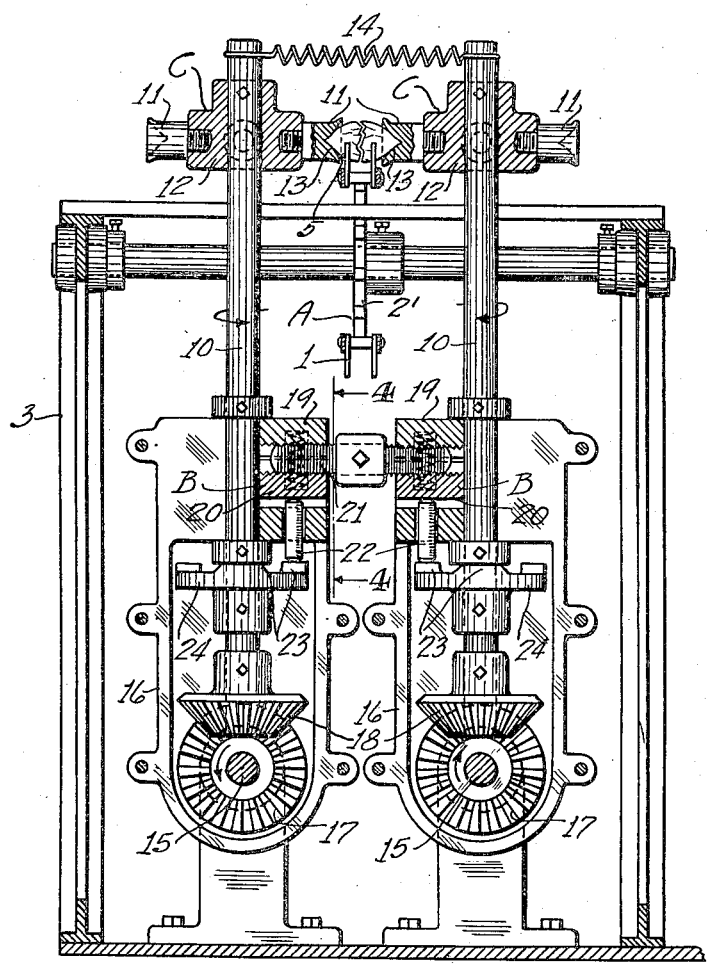
Figure 3 is a sectional view of the machine taken approximately along the line 3—3, Figure 1.

10, 10, designate shafts which are adapted for rotation in opposite directions, as shortly appearing, and which are swingably mounted upon opposite sides in lateral adjacence to the carrier A for swingably shifting movement of their free or upstanding ends inwardly towards or outwardly away from the carrier. A plurality of anvils 11, 11, disposed in an annular series are mounted on the free end of each of the shafts 10, and I show one manner in which this may be done, wherein a hub 12 is setscrewed on each of the shafts 10. In the present instance, four of the anvils 11 are suitably threaded in and equally spaced around the hub 12, each of the anvils being thus radially presented from the rotary shafts 10, and each being provided at its free or outer end with a suitable nut-receptive socket 13. So disposed, the anvils 11, 11, are adapted for co-operation in opposed pairs, each anvil being adapted to move in a curved or annular path about, and on rotation of, the shafts 10. Means are provided for tensionally connecting the shafts or supports 10, 10, which, in the embodiment shown, comprises a spring 14 formed with suitable eyes at its opposite ends for engagement thereof with the respective shafts 10, 10, as best seen in Figure 3.

So tensionally connected by the spring 14, the shafts 10, 10, are yieldingly shiftable normally in opposed directions inwardly towards the carrier traveling therebetween, and on rotation of the shafts 10, 10, as will presently more fully appear, the anvils 11, 11, are moved in their respective annular paths for yieldingly engaging the sockets 13 thereof with the opposite ends of an interposed nut, as 5, on the carrier A as the anvils 11, 11, approach endwise opposing relation, that is to say, as a pair of oppositely approaching anvils 11, 11, move in their respective paths, they will come closer together and in such respect diminish the distance between their socketed ends, so that the nut 5 is caught therebetween, the strength of the tensional member 14 being selected so as to cause the anvils 11, 11, to firmly but yieldingly bear upon the nut in such manner as to apply thereupon, as will be readily seen, a uniform pressure or gripping-action.

I will now describe the manner in which I prefer to swingably and rotatably mount the elements or shafts 10, 10. For such purpose, I suitably mount in the lower part of the frame 3 of the machine a pair of spaced drive shafts 15, 15, driven in unison, as will shortly appear. Freely swingably mounted on each shaft 15, is a frame or preferably a housing 16, in which is journaled, laterally with respect to the drive shaft 15, one of the shafts 10. The shaft 10 is driven from the drive-shaft 15 by means of co-operating bevel gears or like motion transmitting means 17, 18, one of the gears, as 17, being mounted on the drive shaft 15 and the other gear, as 18, being mounted on the adjacent end of the shaft 10. Hence it will be seen that, as the anvils 11, 11, are caused, on rotation of the shafts 10, to oppositely engage a nut 5 on the carrier A, the respective shafts 10, with their supporting frames 16 and carried anvils 11, are adapted for yielding lateral shifting movement with respect to the carrier A, as I have set forth.

Now the strength of the spring 14 is chosen to be less than that required to crack the nut, and hence, at a certain point in the curved path of the movement of the anvil ends, I actuate means for preventing outward displacement of the anvils 11, 11, or, what amounts to the same thing, outward or spreading shifting movement of the shafts 10, 10. This is accomplished preferably just before the anvils 11 are in direct opposing relation, so that, while the anvils 11 are in nut-cracking relation, they are outwardly unyielding with respect to the nut to be cracked. By regulating the point at which the anvils 11, 11, are locked or held against further outward lateral movement, I may vary the cracking pressure co-operatively applied by the anvils 11 upon the nut, this pressure being due, as will readily be understood, by the continued advance upon the nut of each anvil as the same follows its curved or arcuate path. Now, once the machine has been properly adjusted, the distance of this advance of the anvils upon the nut is the same regardless of the dimensions of the nut, and hence neither too much nor too little, but rather the precise required amount of cracking effort is applied in each and every instance.

It may be here stated that, up to the time of locking the shafts 10 against outward shifting movement, the same are independently swingable, subject only to the inward urging of the spring or tensional member 14. Incorporated in each of the opposing walls of the swingable frames 16, 16, is a split nut B having a fixed portion 19 and a shiftable portion 20, both portions being suitably threaded and aligned for co-operation with a like threaded frame-connecting member 21, whose opposite ends are adapted to be engaged with, or disengaged from, the respective nuts 19—20 in the frame 16, 16, the axis of said nuts being preferably disposed in aligned relation for the purpose.

Figure 4:
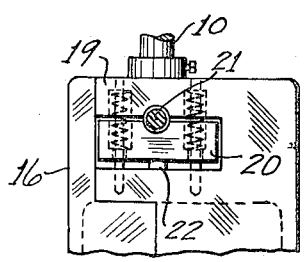
Figure 4 is a sectional view of the machine taken approximately along the line 4—4, Figure 3.

Preferably the shiftable half-nut 20 is spring-set for yielding engagement with the connecting member 21, as best seen in Figure 4, so that, as the shafts 10, 10, swing or shift apart, the member 21 freely slips through the respective nuts B, B. Such slippage, however, is prevented by causing the half-nut 20 to unyieldingly engage the member 21 in co-operation with the other half-nut 19, and in such manner the shafts 10 are rigidly connected one with the other. For such purpose, a plunger 22 is disposed for slidable movement in the frame 16 for impinging engagement at one end with the half-nut 20 when the other end of the plunger is operatively engaged with a cam 23 provided on a cam disc 24 mounted on, and for rotation with, the element 10, as illustrated in Figure 3. The cam 23 is so arranged that the plunger 22 will impinge the half-nut 20 and hold the same for threadedly engaging the connecting member 21 with the split-nut B during that period of revolution of the shaft 10 when the anvils 11, 11, are, as I have described, in opposing or nut-cracking relation.

Figure 2:
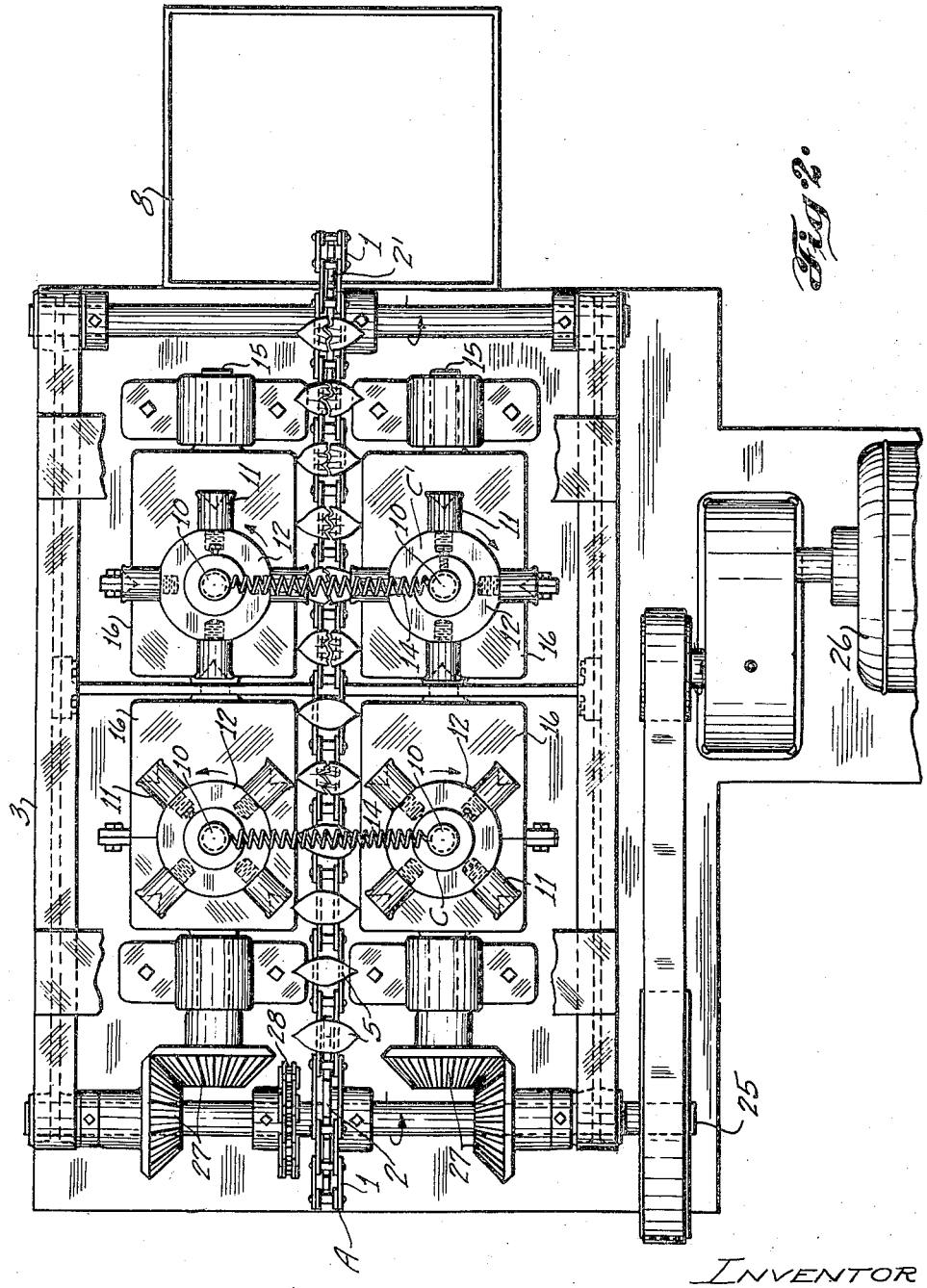
Figure 2 is a top plan view of the machine.

As clearly shown in Figure 2, more than one anvil 11 may be rotatably supported by the respective shafts 10, 10, in such manner that rotation thereof will successively bring the several anvils on each shaft into co-operating and opposed nut-cracking relation, the whole assembly forming a group of such co-operating anvils, as indicated at C. It may be pointed out that the rate of linear travel of the carrier A is necessarily in synchronism with the rate of circular or annular travel of the anvils 11, so that the two rates of travel are the same as nearly as may be while the nut is being cracked.

Hence, by providing more than one anvil on each shaft 10, the spacing of the nuts on the carrier A may be materially reduced. This spacing may be still further reduced by providing a plurality of such groups of anvils as C and C', (Figure 2) one group, as C, being arranged to crack one series of alternate nuts on the carrier A, and the other group, as C', being arranged to crack the other series of alternate nuts not cracked by the group C. Of course, the principle may be extended as far as may be desired commensurate with the required capacity of the machine, which may thus be made great or small, as may be desired.

Finally, I may point out the manner in which I synchronize the operative characteristics of the several parts of the machine, which, in the present instance, I accomplish by driving the machine from a single line shaft 25 suitably journaled in the frame 3 and having suitable driving connection with a prime mover, as a motor 26. From this line-shaft 25, I actuate the drive-shafts 15, 15, and the head-sprocket 2 of the carrier A, the former of each by a pair of bevel-gears, as at 27, and the latter by a chain-and-sprocket connection, as at 28, the pairs of gears 27 being so disposed, as best seen in Figure 2, for varying the direction of rotation of the shafts 15 and consequently also of the shafts 10. Obviously, by suitably proportioning the drive connections 27 and 28, the speed of the operation of the co-operating parts may be synchronized for the purposes set forth.

It is believed that the manner of operation and use of my invention has been fully set forth as the description has proceeded, and it will be readily seen that my invention efficiently accomplishes its purposes and objects, which are to provide a nut-cracking machine characterized, first, by including co-operating pairs of anvils and in setting the anvils on a nut to be cracked with a uniform pressure and then causing the anvils to advance on the nut with a definite and predetermined amplitude of cracking movement and, in addition thereto, to provide such a nut-cracking machine having more than one set of co-operating anvils in co-operation with a carrier in such manner that one set of anvils will crack one series of alternate nuts on the carrier and the other set of anvils will crack the other series of alternate nuts, the whole being co-ordinated and synchronized for the effective coaction of the several parts for the purposes intended.

While I have herein shown and described the preferred embodiment of my invention, it will be understood that changes and modifications in the form, construction, arrangement, and combination of the several parts of the machine may be made and substituted for those herein shown and described without departing from the nature and principle of the invention.

Having thus described my invention, what I claim and desire to secure by Letters Patent is:

1. In a nut-cracking machine, in combination, a pair of pivotally shiftable rotary shafts, means for rotarily actuating the shafts, co-operating anvils on the shafts adapted, on rotary movement of the shafts, to travel in opposed annular paths for engaging an interposed nut, means for yieldingly shifting the shafts pivotally together for disposing the anvils in nut-cracking relation, and means for locking the shafts together against outward shifting movement when the anvils are in nut-cracking relation.

2. In a nut-cracking machine, in combination, a pair of pivotally shiftable rotary shafts, means for rotarily actuating the shafts, co-operating anvils on the shafts adapted, on rotary movement of the shafts, to travel in opposed annular paths for engaging an interposed nut, means for yieldingly shifting the shafts pivotally together for disposing the anvils in nut-cracking relation, and means for locking the shafts together against outward shifting movement when the anvils are in nut-cracking relation, said means including split nuts mounted on the shafts each having a movable member, a shaft connecting-member adapted for co-operation with the nuts, cams on the shafts, and plungers adapted for actuation by the cams for shifting the movable nut-members into engagement with the connecting member.

3. In a nut-cracking machine, a linked carrier movable in a linear direction, cradle means on the carrier for supporting the nuts to be cracked with their ends laterally presented from the carrier, a pair of rotary shafts swingably mounted in lateral adjacence to the carrier for shifting movement towards and away therefrom, a pair of co-operating anvils mounted on the shafts for movement in a curved path about, and on rotation of, its respective shaft, means tensionally connecting the shafts for yielding movement toward said carrier, means for rotatably actuating the shafts for moving the anvils in their said paths for yieldingly engaging the same with the opposite ends of a nut on the carrier as the anvils approach endwise opposing relation, and means adapted for actuation on said movement of the anvils for rigidly connecting the shafts for preventing shifting movement thereof while the anvils are in opposing relation.

4. In a nut-cracking machine, in combination, a pair of rotatively driven shafts transversely shiftable toward and away from each other, co-operating anvils mounted on the shafts for rotation therewith, a spring having connection with the shafts for urging the anvils yieldingly toward each other for crackingly engaging an interposed nut, and releasable locking means simultaneously engageable with the shafts for retaining the shafts against shifting movement when the anvils are in nut-cracking relationship.

5. In a nut-cracking machine, in combination, a pair of rotary co-operating anvils, means for shiftably supporting the anvils in opposed relationship for movement bodily toward and away from each other, means for rotating the anvils in opposed annular paths, means for yieldingly urging the anvils toward each other for engagement with an interposed nut as the anvils rotatively approach opposing relation, and means for holding the anvils against shiftable movement relatively to each other while the same are in cracking-engagement with the nut.

6. In a nut-cracking machine, a plurality of rotary anvils, means for shiftably supporting the anvils in opposed relationship for movement bodily toward and away from each other, driving means for actuating the anvils along converging-diverging paths into and out of paired juxtaposition, means for resiliently urging the anvils toward each other for engagement with an interposed nut as the anvils approach juxtaposed position, and releasable locking means for preventing shifting relative movement of the anvils when the same are in nut-engaging juxtaposition.

7. In a nut-cracking machine, a pair of transversely shiftable rotatable shafts, a plurality of anvils disposed in groups, each group being mounted upon one of the shafts for rotation therewith, means for rotating each of the shafts for movement of successive anvils into and out of paired juxtaposition, means for yieldingly urging said shafts toward each other, and releasable locking means for preventing transverse shifting of the shafts while the anvils are in paired juxtaposition.

8. In a nut-cracking machine, a pair of transversely shiftable rotatable shafts, a plurality of anvils disposed in groups, each group being mounted upon one of the shafts for rotation therewith, means for simultaneously rotating each of the shafts for movement of successive anvils into and out of paired juxtaposition, means for feeding nuts into the path of movement of said anvil-pairs, means for yieldingly urging said shafts toward each other for engagement with interposed nuts as the anvils approach juxtaposed relation, and releasable locking means for preventing transverse shifting of the shafts while the anvils are in cracking-engagement with the interposed nuts.

9. In a nut-cracking machine, a pair of transversely shiftable rotatable shafts, a plurality of anvils disposed in groups, each group being mounted upon one of the shafts for rotation therewith, means for rotating each of the shafts for movement of successive anvils into and out of paired juxtaposition, means for feeding nuts in sequence into the path of movement of said successive pairs of anvils, means for yieldingly urging said shafts toward each other for engagement with interposed nuts as the anvils approach juxtaposed relation, and releasable locking means engageable with the shafts for preventing transverse shifting of the shafts while the anvils are in cracking-engagement with the interposed nuts.

10. In a nut-cracking machine, a pair of transversely shiftable rotatable shafts, a plurality of anvils disposed in spaced pairs of opposing groups, each group being mounted upon one of the shafts for rotation therewith, means for rotating each of the shafts for movement of successive anvils of one shaft into and out of juxtaposed paired relation to corresponding anvils on the other shaft, means for feeding nuts in sequence alternately into the path of movement of the successive pairs of anvils of each of said paired-groups thereof, means for yieldingly urging said shafts toward each other for engagement of each pair with an interposed nut as the anvils approach juxtaposed relation, and means for locking the shafts against relative transverse displacement while the anvils are in cracking engagement with the nuts.

11. In a nut-cracking machine, a pair of rotary shafts having mutually parallel axes and being mutually shiftable toward and away from each other in the plane of their axes, a pair of co-operating anvils mounted on each of the shafts for rotation therewith, means for rotating the shafts for bringing the anvils into juxtaposed relation, means yieldingly urging the shafts toward each other, means for feeding a nut between the anvils as the same approach juxtaposed relation, and means for preventing shifting of the shafts while the anvils are in juxtaposed relation.

12. In a nut-cracking machine, a pair of rotary shafts having mutually parallel axes and being mutually shiftable toward and away from each other in the plane of their axes, a pair of co-operating anvils mounted on the shafts for rotation therewith, means for rotating the shafts for bringing the anvils into juxtaposed relation, means yieldingly urging the shafts toward each other, means for feeding a nut between the anvils as the same approach juxtaposed relation, and means releasably engageable with the shafts in timed relation to the rotation thereof for preventing shifting displacement of the shafts thereof when the anvils are in juxtaposed relation.

13. In a nut-cracking machine, a pair of mutually parallel rotary shafts each pivotally mounted at an end for swinging movement toward and away from each other, an anvil rigidly mounted on, and adjacent the free end of, each shaft, means for rotating the shafts for bringing the anvils of the respective shafts into juxtaposed relation, means yieldingly connecting the free ends of the shafts for normally urging the shafts toward each other, means for feeding a nut between the anvils as the same approach juxtaposed relation, and means releasably engageable with the shafts in timed relation to the rotation thereof for preventing swinging movement thereof when the anvils are in juxtaposed relation.

14. In a nut-cracking machine, a carrier adapted to transport the nuts to be cracked with their ends laterally presented from the carrier, anvil-supporting members disposed in opposed relationship on respectively opposite sides of the carrier, a plurality of anvils each mounted upon an anvil-supporting member for bodily movement in a circular path about a point outside the body of the anvil, said anvils being reciprocally movable in said paths relatively toward and away from each other, means for yieldingly moving said anvils bodily toward each other in their said paths for engaging the same each with an opposite end of a nut on the carrier as the anvils approach juxtaposed relation, and releasable locking means for preventing pathwise movement of the anvils while in juxtaposed relation.

15. In a nut-cracking machine, a linked carrier movable in a linear direction, means on the carrier for supporting the nuts to be cracked with their ends laterally presented from the carrier, a pair of rotatable shafts swingably mounted in lateral adjacency to the carrier for shifting movement towards and away therefrom, a pair of co-operating anvils each mounted on one of the shafts for rotation therewith and for movement in a curved path during swinging movement of its respective shaft, spring means for normally urging the shafts toward the carrier for moving the anvils yieldingly into engagement with the opposite ends of a nut on the carrier as the anvils approach juxtaposed relation, and means releasably engageable with the shafts in timed relation to the rotation thereof for preventing shifting movement of the shafts while the anvils are in juxtaposed relation.

16. In a nut-cracking machine, in combination, a pair of co-operating anvil structures, anvil-supporting members for supporting the anvils for movement in opposed annular paths into and out of facing juxta-position, said anvils being relatively positioned for engaging an interposed nut as they approach said juxta-position, means for actuating the respective anvil structures, means for permitting resilient shifting of the anvil structures bodily toward and away from each other for accommodation of variations in nut-size, and means synchronized with the movement of the anvils in their annular path for holding the anvils against said resilient movement as the anvils come into said juxta-position whereby to exert nut-cracking force upon the interposed nut.

SYLVESTER L. FONTANA.